United States Patent
Kudo

(10) Patent No.: US 8,271,804 B2
(45) Date of Patent: Sep. 18, 2012

(54) INFORMATION PROCESSING DEVICE, LOG MANAGEMENT APPARATUS, AND LOG MANAGEMENT PROGRAM PRODUCT

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 588 days.

(21) Appl. No.: 12/212,170

(22) Filed: Sep. 17, 2008

(65) Prior Publication Data

US 2009/0089592 A1 Apr. 2, 2009

(30) Foreign Application Priority Data

Sep. 28, 2007 (JP) ................................. 2007-255017

(51) Int. Cl.
G06F 12/14 (2006.01)
H04L 29/06 (2006.01)
G06F 7/04 (2006.01)

(52) U.S. Cl. ........ 713/193; 713/155; 713/156; 713/161; 713/165; 713/169; 713/171; 713/173; 713/178; 713/181; 713/185; 713/187; 713/194; 726/1; 726/2; 726/3; 726/4; 726/6; 726/10; 726/26; 726/27; 726/30; 380/277; 380/278; 380/285

(58) Field of Classification Search ................. 713/165, 713/193, 176; 726/30

See application file for complete search history.

(56) References Cited

U.S. PATENT DOCUMENTS

| | | | |
|---|---|---|---|
| 7,383,582 B1 * | 6/2008 | Francis | 726/26 |
| 2003/0023850 A1 * | 1/2003 | Brown et al. | 713/176 |
| 2003/0126432 A1 * | 7/2003 | Tonisson | 713/156 |
| 2003/0177387 A1 * | 9/2003 | Osterwalder et al. | 713/201 |
| 2004/0203755 A1 * | 10/2004 | Brunet et al. | 455/432.1 |
| 2005/0004899 A1 * | 1/2005 | Baldwin et al. | 707/3 |
| 2005/0038795 A1 * | 2/2005 | Charlot et al. | 707/100 |
| 2005/0232421 A1 * | 10/2005 | Simons et al. | 380/255 |

(Continued)

FOREIGN PATENT DOCUMENTS

JP 2001-350652 12/2001

(Continued)

OTHER PUBLICATIONS

JP Office Action dated Aug. 16, 2011, JP Application No. 2007-255017; English Translation.

*Primary Examiner* — Edan Orgad
*Assistant Examiner* — Jenise Jackson
(74) *Attorney, Agent, or Firm* — Banner & Witcoff, Ltd.

(57) ABSTRACT

An information processing device creates a hash value from an event log every time the event occurs. The information processing device generates a digital signature by encrypting the hash value with its own private key. The device transmits the signature-bound event log obtained by binding the digital signature with the event log to a log management apparatus. The log management apparatus decrypts the hash value from the event log of the received signature-bound log information using a device public key. The apparatus also generates a new hash value from the event log verifies the coincidence of the decrypted hash value and the new hash value, and authenticates signature-bound event logs for which this coincidence has been verified. The apparatus stores signature-bound event logs that have been authenticated. Every time an event occurs, the device transmits an event log bound with a digital signature that is created using its private key.

2 Claims, 6 Drawing Sheets

U.S. PATENT DOCUMENTS

| | | | |
|---|---|---|---|
| 2005/0267919 A1* | 12/2005 | Pivar et al. | 707/203 |
| 2007/0005740 A1* | 1/2007 | DiFalco et al. | 709/223 |
| 2007/0067617 A1* | 3/2007 | Tarkkala | 713/2 |
| 2007/0276768 A1* | 11/2007 | Pallante | 705/78 |
| 2008/0082585 A1* | 4/2008 | Elgezabal | 707/200 |
| 2008/0098232 A1* | 4/2008 | Miyazaki et al. | 713/176 |
| 2008/0147559 A1* | 6/2008 | Cohen et al. | 705/59 |
| 2008/0201661 A1* | 8/2008 | Haynes et al. | 715/810 |
| 2009/0271637 A1* | 10/2009 | Takekawa et al. | 713/189 |

FOREIGN PATENT DOCUMENTS

| | | |
|---|---|---|
| JP | 2002-297540 A | 10/2002 |
| JP | 2002-366461 | 12/2002 |
| JP | 2006-222811 A | 8/2006 |
| JP | 2007-174258 | 7/2007 |

\* cited by examiner

INFORMATION PROCESSING DEVICE, LOG MANAGEMENT APPARATUS, AND LOG MANAGEMENT PROGRAM PRODUCT

CROSS-REFERENCE TO RELATED APPLICATION

The present application claims priority from Japanese Patent Application No. 2007-255017, which was filed on Sep. 28, 2007, the contents of which are herein incorporated by reference into the present application.

BACKGROUND OF THE INVENTION

1. Field of the Invention

The present specification discloses a technology relating to managing log information of events that have occurred. The "log information of events" is referred to as "event log" hereinbelow. This application discloses teachings whereby special data is bound to an event log, so as to easily find tampering with an event log that is transmitted from an information processing device to a log management apparatus through a network, and teachings of managing an event log to which such special data is bound. This application also discloses teaching whereby event log tampering can be easily found without increasing the communication load on the network, by binding special data to the event log. In this application, an "information processing device" refers to a device that is connected with a network, such as a printer or copier or multifunction device.

2. Description of the Related Art

Whenever an event such as a paper jam or printing occurs in a printer (an example of an information processing device), the detail of the occurred event is preferably stored in the form of an event log. This event log may also contain information associated with the event (e.g. in the case of a printing event, information regarding the number of times of printing or the number of printed sheets may be included).

A technique for managing event logs in individual information processing device has been proposed (e.g., see Japanese Patent Application Publication No. 2002-366461). In this technique, management is effected by encrypting the event log of each event. A technique has also been proposed of managing event logs using a server by transmitting the event log to the server. By employing a server, the event logs of all of the information processing devices connected to a network can be managed collectively. Also, the server can manage a large amount of event logs.

When event log is transmitted to the server from the information processing device through the network, there is a risk that the event log may be read by another party and tampered with while the event log passes through the network. Accordingly, the technique has been proposed of transmitting the event log to the server in encrypted form. Such a technique is disclosed in for example Japanese Patent Application Publication No. 2007-174258 or Japanese Patent Application Publication No. 2001-350652. In the latter Publication, a technique is disclosed of transmitting an event log to a server using an encryption technique called SSL (Secure Sockets Layer).

BRIEF SUMMARY OF THE INVENTION

Since the protocol of encrypted communication using SSL is complex, the communication overhead (the time required for process other than the transmission of the data, such as the handshaking time and key exchange time, etc.) is considerably large. Consequently, in the case of information processing devices, in particular, printers, copiers or multifunction devices that raise events frequently, if the event log is communicated by SSL for each event, the communication load will be increased. On the other hand, if a number of event logs are accumulated in an information processing device, and the accumulated event logs are collectively transmitted, the damage resulting if they are tampered with may be considerably large. The present specification discloses a technique providing countermeasures against event log tampering during transmission through the network without increasing the communication load.

The tampering countermeasure disclosed in the present specification creates a signature-bound event log by binding the event log with a digital signature that is created from the event log every time an event log is created, and transmits the signature-bound event log to a log management apparatus through the network. Consequently, the increase in the communication load may be suppressed to be small, since only the signature-bound event log is transmitted on the network without any other communication overhead such as SSL. In addition, log tampering can easily be found by utilizing the digital signature that is bound to the event log.

One of the teachings disclosed in this application is an information processing device capable of connecting with a network. The information processing device transmits an event log to a log management apparatus through the network. The information processing device may create an event log describing the details of the event having occurred in the information processing device, every time a predetermined event occurs. The information processing device may create a hash value from the event log every time the event log is created. Furthermore, the information processing device may create a digital signature by encrypting the hash value using a private key of the information processing device, every time the hash value is created. In addition, the information processing device may create a signature-bound event log in which the digital signature is bound with the event log. The information processing device may transmit the signature-bound event log to the log management apparatus through the network, every time the signature-bound event log is created. Specifically, the information processing device may have one or more modules that may execute the process as described above.

Some tangible examples of "events" are as follows. In the case of a printer, the events that trigger the creation of event logs by the information processing device are paper jams or printing processing execution or the like. One of the event logs relating to execution of printing processing may include information associated with printing processing, such as the number of times of printing, the number of sheets printed, and sheet size. Specifically, one of the event logs may include information that specifies the occurred event and additional information associated with the occurred event. In the case of a facsimile device, the events that are the subject of event logs may be transmission processing of a facsimile, or reception processing. In the case of a facsimile device, the additional information associated with the event may include the transmission details (e.g. image of the cover sheet of the facsimile), transmission destination, or information related to the transmission source.

The information processing device as described above may transmit a signature-bound event log, in which event log is bonded with a signature created by a private key (information processing device-side private key), over the network every time an event occurs. Since the data passing over the network merely constitutes a small amount of data corresponding to a signature-bound event log, there only may be a mere increase of transmission load. It may be noted that since a hash function may be employed in creating a digital signature, a different digital signature may be created in each process of digital signature generation. Consequently, even if a single signature-bound event log is decoded and tampered with, the fact of the tampering can be easily discovered. In addition, since only the information of a single event is contained in a single signature-bound event log, even under a case in which a signature-bound event log is tampered with, the amount of information illicitly altered can be minimized.

Other teachings disclosed in the present specification may be realized as a log management apparatus connected to a network. The log management apparatus may receive a signature-bound event log from the aforementioned information processing device through the network. The respective event logs may be created by the information processing device every time a predetermined event occurs. The log management apparatus may decrypt the hash value from the digital signature that is bound in the received signature-bound event log by using a public key of the information processing device. The log management apparatus may also create a new hash value from the event log in the received signature-bound event log. In addition, the log management apparatus may verify coincidence between the decrypted hash value and the new hash value. If coincidence of the decrypted hash value and the new hash value is successfully verified, the log management apparatus may authenticate the signature-bound event log. Furthermore, the log management apparatus may store the signature-bound event logs that have been successfully authenticated. Here, a distinction is made between signature-bound event logs that have been successfully authenticated and those that have not been successfully authenticated. Signature-bound event logs that have not been successfully authenticated may either be stored separately from signature-bound event logs that have been successfully validated, or may be discarded. The log management apparatus may have one or more modules that may execute the process as described above.

With the above log management apparatus, signature-bound event logs that have been successfully validated (authenticated), in other words, signature-bound event logs which have been confirmed that no tampering has been inflicted are deemed to be reliable event logs, and scan be stored.

Other teachings disclosed in the present specification can be embodied alternatively in another log management apparatus. The log management apparatus may store a managing-side private key. The managing-side private key may be a private key of the log management apparatus. The log management apparatus may receive signature-bound event log created by the information processing device. Signature-bound event log is as described above. Further, the log management apparatus may create a time-stamped signature-bound event log by appending a current time to the received signature-bound event log. The log management apparatus may also create a managing-side hash value from the time-stamped signature-bound event log. Moreover, the log management apparatus may create a managing-side digital signature by encrypting the managing-side hash value with the managing-side private key. In addition, the log management apparatus may create a managing-side signature-bound event log by binding the managing-side digital signature with the received signature-bound event log. The log management apparatus may store the managing-side signature-bound event log. The log management apparatus may have one or more modules that may execute the process as described above.

The above log management apparatus appends the current time to the received signature-bound event log. The time relationship of a plurality of received signature-bound event logs can be precisely managed by means of the appended current time information. The current time may be termed as information that indicates the chronological relation of the signature-bound event logs with respect to the order of their receipt by the log management apparatus. Even if the information processing device that transmits the signature-bound event log is not provided with a time measurement unit (e.g. a clock) the log management apparatus can manage the chronological relationship of a plurality of signature-bound event logs. Furthermore, the event log binds two different digital signatures (the digital signature created by the information device and the managing-side digital signature that is bound by the log management apparatus). This log management apparatus can ensure a high security in the management of the event logs.

The technical features of the above log management apparatuses may at least in part be combined into one log management apparatus. In this case, the log management apparatus may comprise modules that materialize the combined processes. In this log management apparatus, the current time may be appended to a signature-bound event log that has been received and successfully authenticated. Consequently, a hash value may be created from the signature-bound event log to which the current time has been appended. Then, a managing-side digital signature is created by encrypting the aforesaid hash value by using the managing-side private key. In addition, a managing-side signature-bound event log wherein the managing-side signature is bound to the received signature-bound event log may be created and stored.

This log management apparatus may manage a plurality of signature-bound event logs which have been confirmed that no tampering has been inflicted thereon (in other words, signature-bound event logs that have been successfully authenticated), including their time relationships. With this log management apparatus, two different digital signatures are bound to a valid event log, which ensures a high security.

As described above, the present specification discloses teachings for managing event logs that are communicated through a network, whereby event log tampering can easily be found without increasing the communication load.

DETAILED DESCRIPTION OF THE PREFERRED EMBODIMENT

A preferred embodiment of the present invention is described below with reference to the drawings. This embodiment shows a log management system 100 in which a printer 10 and a log management server 50 are connected with a network 80. Here, the printer 10 embodies one of the teachings of the present invention, and the log management server 50 embodies one of other teachings of the present invention. Hereinbelow, the log management server 50 may simply be referred to as the 'server 50'.

Figure 1:
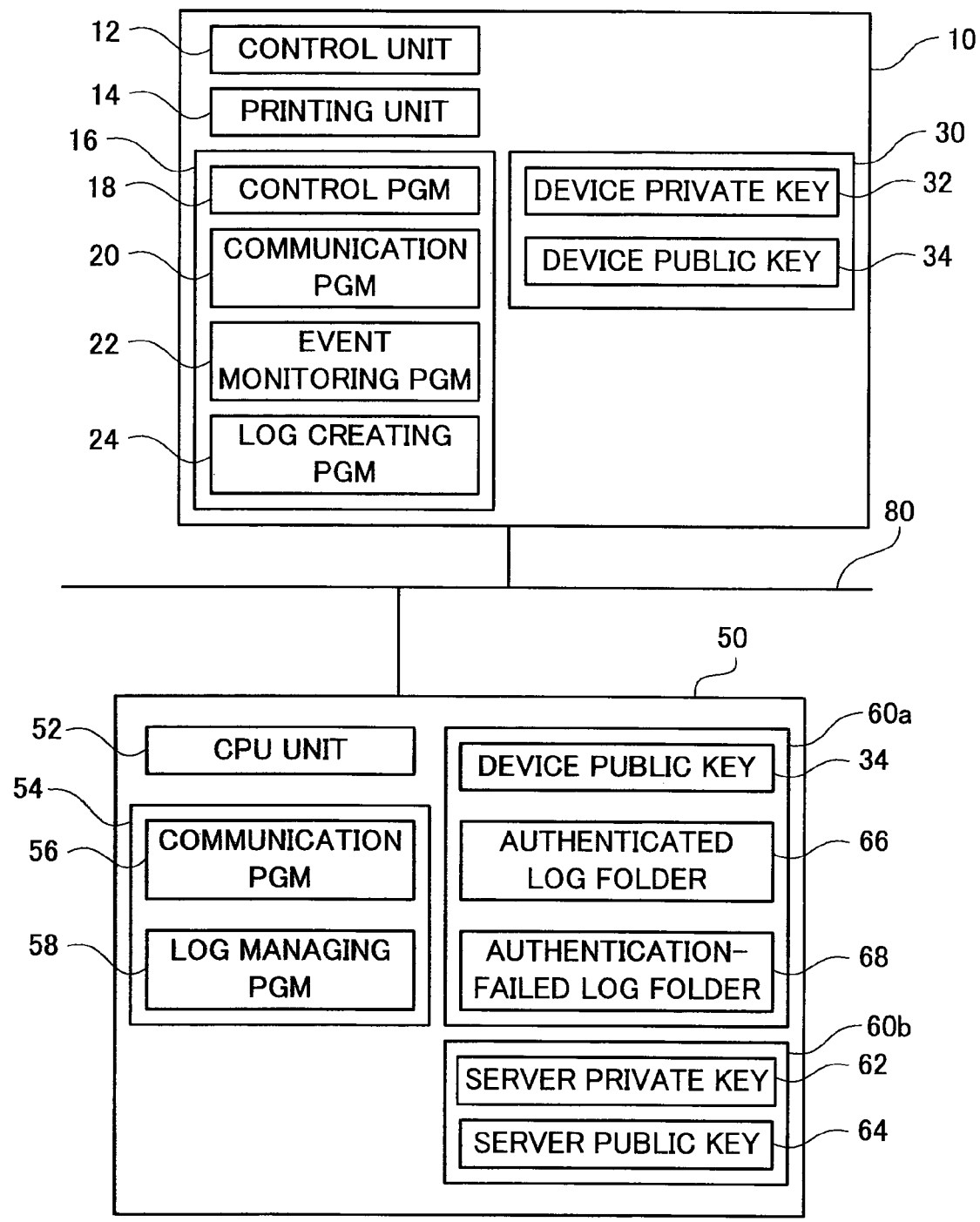
FIG. 1 shows a block diagram of a log management system.

FIG. 1 shows a block diagram of the log management system 100. The log management system 100 is a system for managing event logs at the server 50. Each of the event logs records individual event, such as startup events, printing events, or paper jamming events that occurs in the printer 10. Each of the event logs is created by the printer 10 and transmitted to the server 50.

The configuration of the printer 10 will now be described. The printer 10 comprises a control unit 12, printing unit 14, program storage unit 16, and data storage unit 30. The control unit 12 performs control of the printing unit 14 and control of communication with other devices that are connected with the network 80 (e.g. the server 50). The processes to be executed by the control unit 12 are described by the various programs stored in the program storage unit 16. The letters "PGM" in FIG. 1 indicate "program". The printing unit 14 comprises hardware for performing printing. Although not shown in the drawings, the printing unit 14 comprises hardware such as a paper feed mechanism, printing head, sensor for detecting paper jamming, and a counter that counts the number of sheets that are printed.

The control program 18 describes for example the process for controlling the printing unit 14. The communication program 20 describes communication processes between the printer 10 and other devices connected with the network. The communication program 20 is a program for effecting communication with other devices by a protocol based on UDP/IP. Specifically, the communication processes include a process for transmitting an event log of an event that occurred in the printer 10 to the server 50 and a process for transmitting the device information of the printer 10 to the server 50 in response to a request from the server 50. The device information is data inherent to the printer 10. For example, the device information includes unique information: the device name of the printer 10, the device public key 34, and the like. The device information is stored beforehand in the data storage unit 30 of the printer 10.

The event monitoring program 22 describes a process (event monitoring processing) for monitoring occurrence of events that are the subject of recording. The events to be detected by the event monitoring process are determined in advance. Sensors and processing for detecting occurrence of these predetermined events are therefore incorporated in the printer 10. The events that are the subject of recording are, for example, the startup event (startup of the printer 10), printing event, and paper jamming event.

The log creating program 24 describes a process for creating an event log that describes an event detected by the event monitoring process and transmitting the event log to the server 50. The event log may include information associated with the event detected. For example, in the case of a startup event, the event log may include the number of times of startup. On the other hand, in the case of a printing event, the event log may include information such as the number of printed sheets or the name of the device that gave instructions for printing (i.e. the device, connected with the network 80, that had transmitted command requesting the printer 10 to execute printing process), file name of the data that was printed, memory location and capacity and the like. Every time a predetermined event occurs, the log creating program 24 is executed to create an event log according to the detected event. In this sense, the log creating program describes a process for creating event logs that describe events that have occurred.

The data storage unit 30 stores the data of the private key of the printer 10 (i.e. device private key 32) and data of the public key of the printer 10 (i.e. device public key 34). The device private key 32 and the device public key 34 are respectively the data of the private key and public key of an encryption technology so-called the public key encryption system. The device private key 32 and the device public key 34 are unique to the printer 10. The device public key 34 can be transmitted to other devices that are connected to the network 80. On the other hand, the device private key 32 cannot be transmitted to other devices and thus held in secret. It should be noted that, although the device private key 32 and the device public key 34 are stored in a data storage unit 30 that is independent of the control unit 12, in an alternative embodiment, these could be stored in other configuration, e.g. in a ROM provided in the control unit 12.

The configuration of the log management server 50 will now be described. The server 50 comprises a CPU unit 52, a program storage unit 54, and storage units 60a and 60b. The CPU unit 52 executes communication processes for communicating with a network device such as the printer 10 using a communication program 56 that is stored in the program storage unit 54. Also, the CPU unit 52 executes a log managing process of event logs received from the printer 10 using the log managing program 58 that is stored in the storage unit 54.

The information that is stored in the data storage unit 60a will now be described. The device public key 34 is the data of the key that is publicly disclosed by the printer 10. The device public key 34 stored in the data storage unit 60a is a copy of the device public key 34 stored in the printer 10. The server 50 is able to acquire the device public key 34 from the printer 10 and store it.

The authenticated log folder 66 is a folder that stores event logs, received from the printer 10, that have been successfully authenticated using the device public key 34. The authentication-failed log folder 68 is a folder that stores event logs, received from the printer 10, that have not been successfully authenticated using the device public key 34. In other words, the server 50, among the event logs received from the printer 10, stores the successfully authenticated event logs separately from event logs whose authentication has failed.

Next, the data stored in the data storage unit 60b will be described. The server private key 62 and the server public key 64 are respectively the data of the private key and public key data in the public key encryption system. The server private key 62 and the server public key 64 are unique to the server 50. This public key 64 can be transmitted to other devices that are connected with the network 80. In contrast, the server private key 62 cannot be transmitted to other devices. It should be noted that the server private key 62 and the server public key 64 may alternatively be stored on ROM, not shown in FIG. 1, in the same way as in the case of the device private key 32 etc.

An outline of the operation of the log management system 100 will now be described. The printer 10 creates an event log describing the details of an event every time the event occurs. The printer 10 creates a hash value from the created event log. Also, the printer 10 encrypts the hash value using the device private key 32. The "encrypted hash value" is also termed as a "digital signature". Thus, the digital signature is created by encrypting the hash value with the device private key 32. Next, the printer 10 binds this digital signature to the event log. The "event log with a digital signature bound to it" is also termed as a "signature-bound event log". The printer 10 sends the signature-bound event log to the server 50. The server 50 attempts to verify the received signature-bound event log by using the device public key 34 of which the server 50 has acquired from the printer 10. The verification of the signature-bound event log is performed by the following procedure. The server 50 obtains a hash value by decrypting the digital signature bound in the signature-bound event log using the device public key 34. In other words, the server 50 decrypts the hash value from the digital signature of the signature-bound event log by using the device public key 34. Next, the server 50 creates a new hash value from the event log of the signature-bound event log, separately from the decrypted hash value. The server 50 then verifies the coincidence of the newly created hash value with the decrypted hash value. If the hash value decrypted from digital signature and the new hash value are identical, the server 50 authenticates the signature-bound event log. That is, the server 50 authenticates the signature-bound event log whose coincidence has been verified.

Then, the server 50 appends a header including the current time to the signature-bound event log that has been successfully verified. The current time to be appended may be the actual time at which the appending process had taken place, the time at which the signature-bound event log has been received or verified, or the like. The CPU 52 incorporates a clock (not shown), so the server 50 can acquire the current time from the clock. Then, the server 50 creates a hash value from the appended header, and creates a digital signature by encrypting the hash value with the server private key 62 possessed by the server 50 itself. In this specification, the digital signature employing the server private key 62 may be termed as the "managing-side digital signature". Then, the server 50 binds the managing-side digital signature to the signature-bound event log that has been authenticated. The signature-bound event log with binding the managing-side digital signature may be termed the "managing-side signature-bound event log". The server 50 stores the managing-side signature-bound event log obtained by the binding of the header and the managing-side digital signature data in the authenticated log folder 66. The server 50 appends a header including the current time to the signature-bound event logs that have not been successfully verified, and stores these in the authentication-failed log folder 68. It is noted that the server 50 may bind the managing-side digital signature to the signature-bound event logs that have not been verified and store it.

Figure 2:
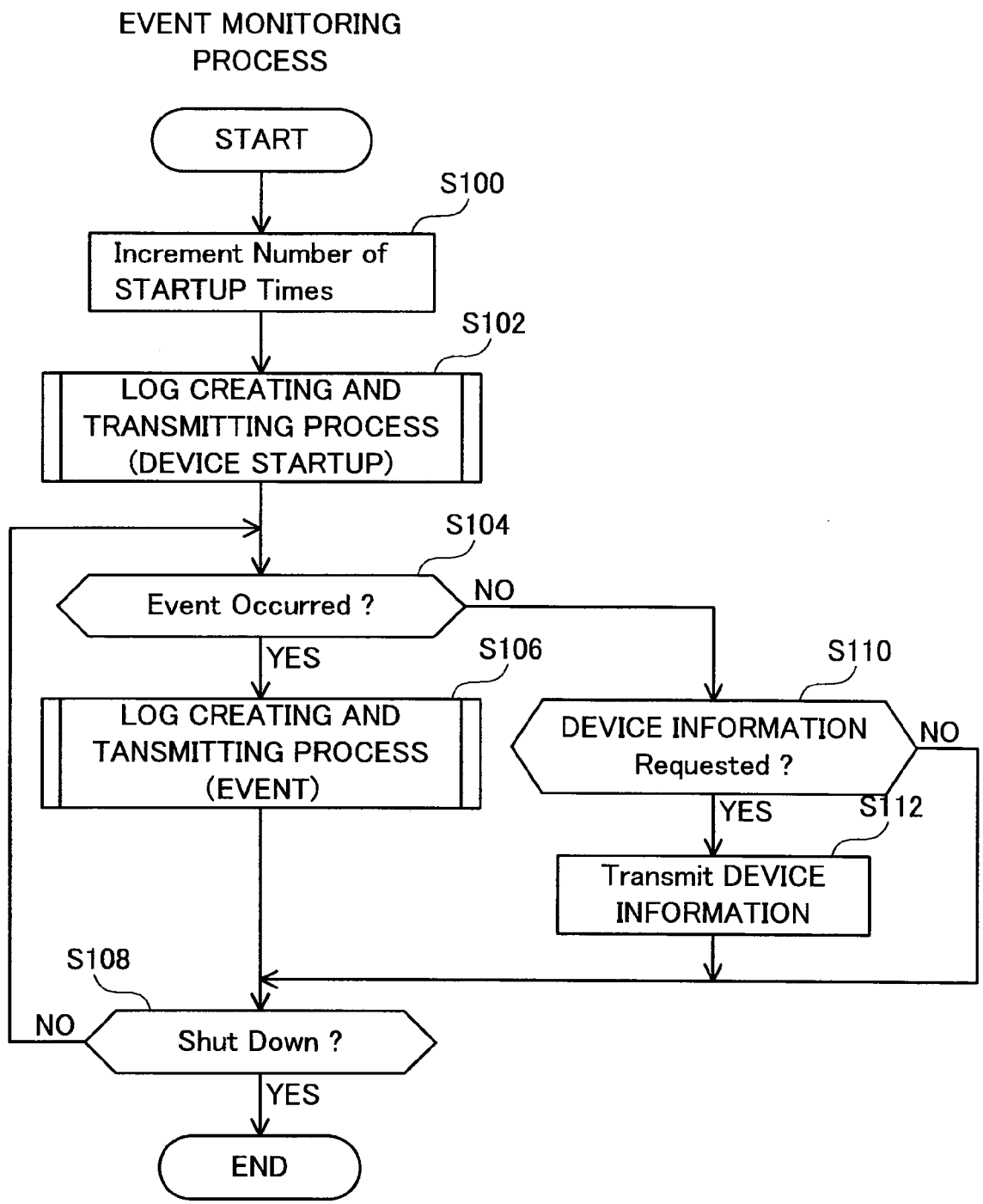
FIG. 2 shows a flow chart of event monitoring process.
Figure 3:
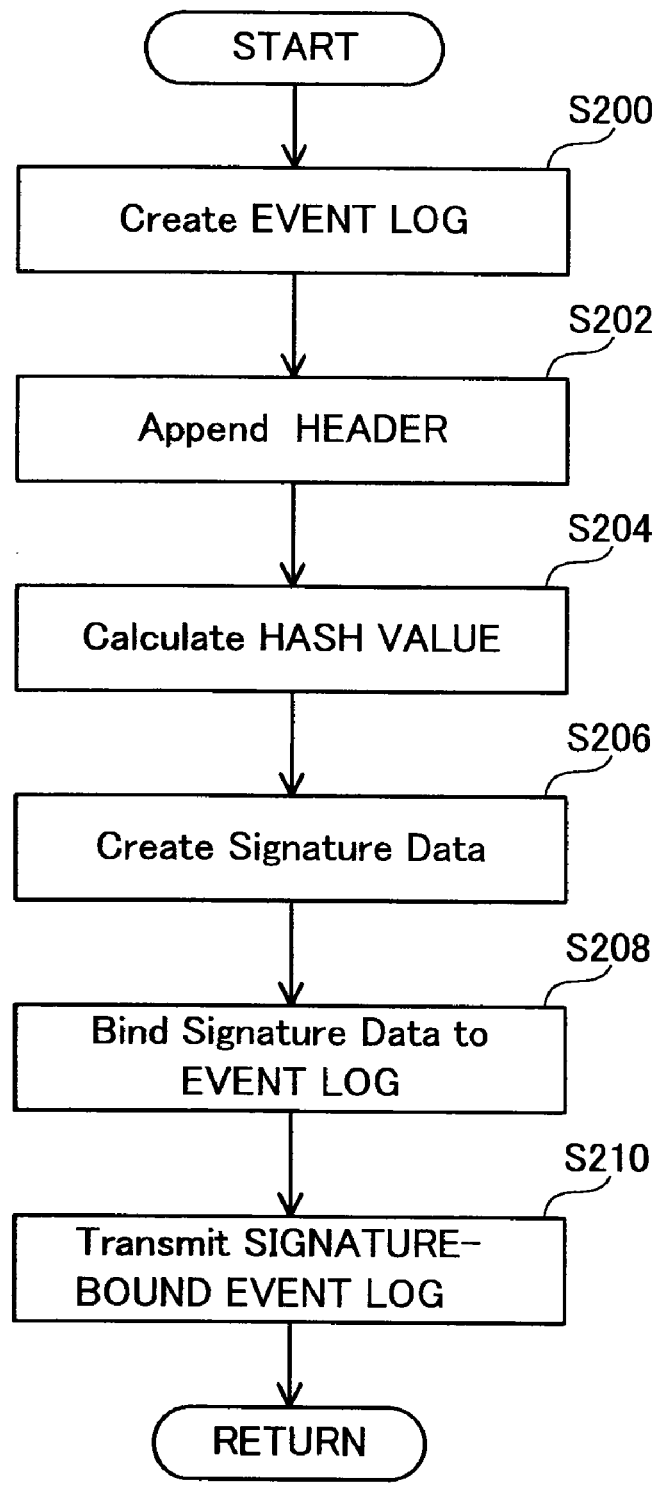
FIG. 3 shows a flow chart of log creating and transmitting process.

Next, the processes executed by the printer 10 will be described in detail. FIG. 2 is a flow chart showing the event monitoring process that is executed by the printer 10. FIG. 3 is a flow chart of the log creating and transmitting process that is executed by the printer 10. The instructions that realize the event monitoring process for the control unit 12 are described in the event monitoring program 22. The instructions that realize the log creating and transmitting process for the control unit 12 are described in the log creating program 24.

The event monitoring process is started up together with startup of the printer 10. In the event monitoring process, first of all, the value expressing the number of startup times (number of times the startup of the printer 10 has been performed) is incremented by 1 (step S100). The data of the number of startup times is stored in the data storage unit 30. In step S100, the control unit 12 reads the data of the number of startup times that is stored in the data storage unit 30. It then adds 1 to the data of the number of startup times. The control unit 12 again stores the data of the number of startup times in the data storage unit 30. That is, the number of times of startup is updated every time the printer 10 starts up.

Next, in the event monitoring process, the log creating and transmitting process is called (step S102). At this point, additional information is transferred to the log creating and transmitting process. This additional information expresses the information that is associated with the occurred event. In the case of step S102, the occurred event is a "startup event", and the additional information is the number of startup times. The details of log creating and transmitting process will be described later with reference to FIG. 3.

Next, the event monitoring process monitors for the occurrence of events that are the subject of recording logs. This watch is continued until the printer 10 is shut down: i.e. until the power switch is turned OFF (step S108, NO and step S104). As described above, the types of events that are the subject of recording are set in advance. Specifically, when an event that is the subject of recording occurs, a decision 'YES' is made in step S104. When the event monitoring process detects occurrence of an event (step S104: YES), the control unit 12 calls the log creating and transmitting process (step S106). As described above, the type of occurring event and the additional information related to the event are transferred to the log creating and transmitting process. The additional information differs in accordance with the type of event.

If no event that is the subject of recording is detected (step S104: NO), the event monitoring process monitors (step S110) whether or not a request for device information from other device (e.g. the server 50) connected with the network 80 has been received. If the printer 10 receives such a request, the printer 10 transmits the device information to the device that had sent the request (step S112). "Device information" may mean the device public key 34 that is stored in the data storage unit 30 and data of the identifier of the printer 10. If the printer 10 is shut down (step S108: YES), the event monitoring process terminates; otherwise, the process again returns to the step S104 (step S108: NO). In this configuration, the log creating and transmitting process (steps S102 or S106) is called every time an event occurs.

The log creating and transmitting process will now be described with reference to FIG. 3. As described above, the log creating and transmitting process is called from the event monitoring process (steps S102 and S106 of FIG. 2). At this point, the type of event and the information to be appended are transferred. In the log creating and transmitting process, first of all, an event log is created (step S200) from the type of event and additional information that have been transferred. The event log is constituted by text data that describe the type of event that had occurred and the additional information of the occurred event. An example of such an event log will be described later.

Next, the printer 10 appends a header to the event log (step S202). The header includes information such as the number of startup times, the current time, and the number of times an event log has been created. It is noted that "the number of times an event log has been created" may be referred to as "the log number". "Number of startup times", as described with reference to step S100 of the event monitoring process, is the number of times that the printer 10 has been started up. The data of the number of startup times is stored in the data storage unit 30. The current time is acquired from the clock that is incorporated in the control unit 12. The log number is numerical data that is incremented by one each time an event log is created. Specifically, the log numbers represent the time-series order of the event logs. It may be noted that the log creating and transmitting process is called every time an event occurs, so the log number represents the sequential number of occurrence of events. Also, since an event log is created and transmitted every time an event occurs, the log number represents the number of event log transmission that has been conducted. It is noted that, since the control unit 12 executes the process for creating event logs (step S200) and the process for appending a header (step S202), the control unit 12 may be referred to as a "log creating module".

Next, the printer 10 calculates hash value from the event log that includes the header (step S204). Then, the printer 10 creates signature data (a digital signature) from the calculated hash value using the device private key 32 (step S206). The expression "creation of signature data" means encryption of the calculated hash value using the device private key 32. Also, the expression "creation of signature data" may alternatively be referred to as "the event log created in step S200 is encrypted using the device private key 32". The "hash value" and "digital signature" are well-known terms of art and a detailed description thereof will be omitted.

Next, the printer 10 converts the digital signature (signature data) that has been created into text data. The printer 10 binds the converted digital signature with the event log (event log to which a header has been appended) (step S208). The event log to which the digital signature has been bound may be referred to as a "signature-bound event log". The reason for converting the digital signature into the text form is to standardize the entire signature-bound event log in the form of text data, since the event log is already in the form of text data. By standardizing the event log, to which a header has been appended in step S202, and the digital signature in the text form, process in the server 50 that receives the signature-bound event log can be simplified. In this way, for example, a user can view the signature-bound event log in text format without any specialized viewer. Also, by standardizing in the form of text data, errors such as bafflegab on data communication is made to less likely occur.

Since the control unit 12 executes the process for calculating the hash value (step S204), the control unit 12 may alternatively be referred to as a "hashing module". Also, due to the execution of the process for creating the digital signature (step S206) and the process for binding the digital signature to the event log (step S208), the control unit 12 may alternatively be referred to as a "signing module".

In step S210, the printer 10 transmits the signature-bound event log to the server 50. Since the event log in the signature-bound event log is not encrypted, when the user views the event log on the server 50, the event log does not need to be decrypted. It should be noted that, in step S210, specifically, the signature-bound event log is transferred to the communication program 20. The communication program 20 converts the signature-bound event log into the form of packets, which are then transmitted based on UDP (User Data Protocol). The UDP data is appended to the packetized signature-bound event log that is transmitted. Due to the execution of step S210, the control unit 12 may alternatively be referred to as a "transmitting module".

Figure 4:
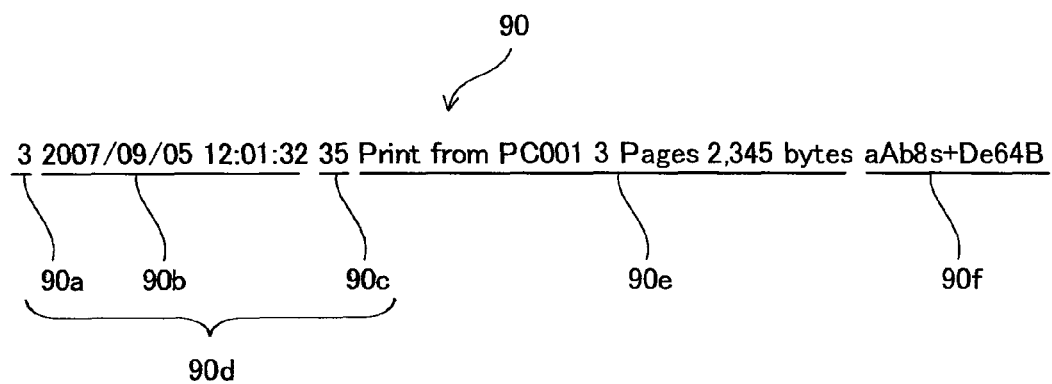
FIG. 4 shows an example of a signature-bound event log.

FIG. 4 shows an example of a signature-bound event log. The signature-bound event log 90 includes the header 90d, the main body 90e of the event log, and the signature data 90f (digital signature on the printer 10 side). The header 90d includes the number of startup times (90a), the current time (90b) and the log number (90c). The main body 90e of the event log comprises statements of the type of event occurred and additional information associated with the occurred event. In the example shown in FIG. 4, the character string "Print from PC001" indicates that a printing event has happened in response to an instruction from a terminal whose name is "PC001". The character string "3 Pages 2345 bytes" indicates that the number of sheets printed is three sheets and the amount of data printed is 2345 bytes. The character string "3 Pages 2345 bytes" is the additional information associated with the event. The signature data 90f is the digital signature created in step S206.

The usage of a header 90d in management of the event logs will now be described. An event log includes data 90a regarding the number of times of startup. Event logs in which the same number of times of startup is included therefore represent that the events have happened in the same startup period (i.e. operating period of the printer 10). The time at which an event occurred can be specified by means of the current time data 90b. It should be noted that, instead of the current time data, the additional information may include the elapsed time after starting up of the printer 10. In the case of elapsed time, the time between event occurrences can be specified. It is also possible to specify the time order of occurrence of events by using the log number 90c. Also, by appending a header 90d, events are created that always include different content even if the main body 90e of the event log is the same (i.e. even if the additional information and the event are the same). In this way, it is possible to prevent event logs created at different times from having the same signature data 90f. Preferably the header 90d includes all of the number of startup times 90a, the current time 90b (or time elapsed after startup) and log number 90c, however, it may alternatively include at least one of these items.

Figure 5:
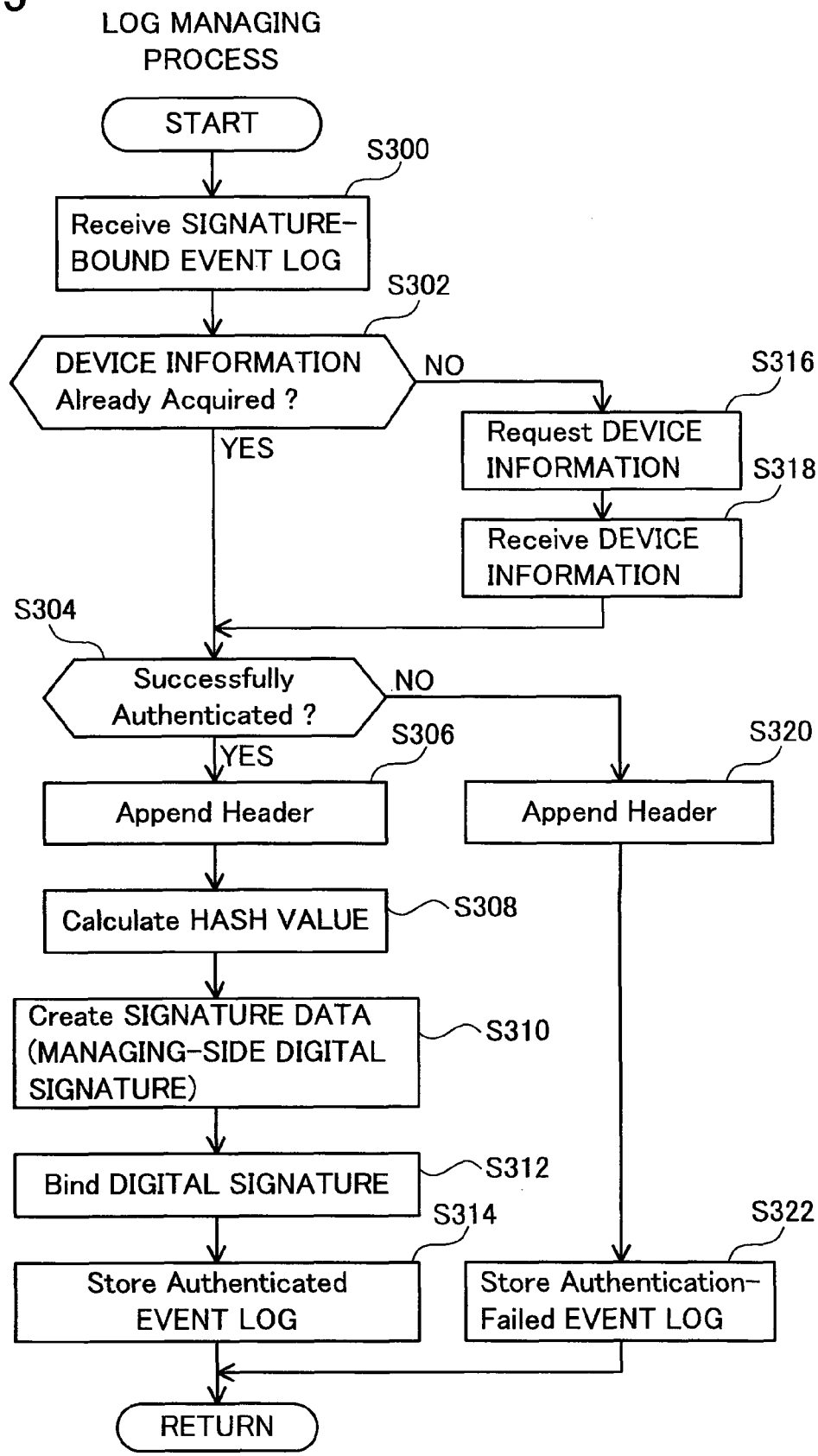
FIG. 5 shows a flow chart of log managing process.

Next, the processes performed by the server 50 (log management server 50) will be described. FIG. 5 shows a flow chart of the log managing process that is executed by the server 50. The log managing processing is started upon receiving the signature-bound event log. It should be noted that, in FIG. 5, in order to facilitate understanding of the process, the step of receiving the signature-bound event log is described as the initial process in the log managing process (step S300).

As described above, the signature-bound event log is transmitted based on UDP. The device name of the data transmission source is appended to the UDP packet. Consequently, the server 50 can specify the source device that has transmitted the signature-bound event log. The server 50 checks whether or not the device information of the source device has already been acquired (step S302). As described above, the device information includes the device public key 34 and the device name of the printer 10. If the device information has not already been acquired (step S302: NO), the server 50 requests the printer 10 to transmit the device information (step S316). The printer 10, in response to the request from the server 50, transmits the device information (step S112 in FIG. 2). The server 50 receives the device information from the printer 10 (step S318), and stores the received data in the data storage unit 60a. On the other hand, if the device information has already been acquired (step S302: YES), the server 50 shifts to step S304 without executing steps S316 and S318.

In step S304, the server 50 tries to verify the received signature-bound event log using the device public key 34 (step S304). Verification is executed by the same procedure as described above. That is, the server 50 first of all decrypts the hash value from the digital signature bound in the received signature-bound event log, by using the device public key 34. Next, the server 50 creates a new hash value from the event log in the received signature-bound event log. The server 50 then verifies the coincidence of the new hash value and the hash value decrypted from the digital signature. If the signature-bound event log has not been tampered with, coincidence of the hash value decrypted from the digital signature and the new hash value is verified. The server 50 then successfully authenticates the signature-bound event log that it has received (step S304: YES). On the other hand, if the signature-bound event log has been tampered with, the hash value obtained by decryption from the digital signature will not be the same as the new hash value. In this case, the server 50 fails authentication of the received signature-bound event log (step S304: NO). In other words, if authentication succeeds, it may be concluded that the signature-bound event log has not been tampered with; whereas, if authentication fails, it may be concluded that the signature-bound event log has indeed been tampered with.

If the server 50 has authenticated the received event log (step S304: YES), the server 50 appends a header (step S306) to the received signature-bound event log. The header contains information such as the device name (in this case, the name of the printer 10) of the source device transmitting the signature-bound event log, the number of times that the signature-bound event log has been received from the source device, and the current time. The header will be described later with reference to examples.

Next, in step S308, the server 50 calculates a hash value from the signature-bound event log to which a header has been appended. In other words, the server 50 creates a hash value from the signature-bound event log to which a header has been appended. Next, the server 50 creates the server-side digital signature from the calculated hash value, using the server private key 62 (step S310). Here, "the server-side digital signature" corresponds to "the managing-side digital signature". The steps for the calculation of the hash value and creation of the server-side digital signature are the same as the steps in the case of the printer 10 (steps S204, S206 in FIG. 3).

Next, the server 50 binds the server-side digital signature with the signature-bound event log to which the header was appended (step S312). Hereinbelow, an event log to which the server-side digital signature has been bound will be termed a "managing-side signature-bound event log". Next, in step S314, the server 50 stores the managing-side signature-bound event log in the authenticated log folder 66 of the data storage unit 60a.

If the server 50 has not authenticated the received event log (step S304: NO), the server 50 appends a header to the signature-bound event log (step S320). Here, the event log that has not been authenticated by the server 50 is termed an "authentication-failed event log". The header that is appended in step S320 is the same as the header that is appended in step S306. The server 50 then stores the authentication-failed event log in which the header has been appended to the signature-bound event log into the authentication-failed log folder 68 (step S322). It is noted that the server 50 stores the authentication-failed event log without binding server-side digital signature therewith. It may be said that the authenticated event logs and the failed event logs are distinguished by the folders in which they are stored (or the regions of the storage unit 60a in which they are stored), and also by whether or not the event log is bound with the server-side digital signature.

In the above process, the CPU unit 52 executing the step S300 of receiving a signature-bound event log may alternatively be referred to as a "receiving module". The CPU unit 52 executing the step S304, whereby the received signature-bound event log is authenticated by verifying the coincidence of the hash value derived from the received signature-bound event log and the new hash value created from the event log may alternatively be referred to as an "authenticating module". The CPU unit 52 executing the step S306 and step S308 of appending a header with a successfully authenticated signature-bound event log and creating a hash value (a managing-side hash value) of the signature-bound event log with the header appended signature-bound event log may alternatively be referred to as a "managing-side hashing module". Also, the CPU unit 52 executing the steps S310 and S312, of creating the server-side digital signature by encrypting the managing-side hash value using the server private key 62 and creating server-side signature-bound event log may alternatively be referred to as a "managing-side digital signature module". The authenticated log folder 66 and the CPU unit 52 executing the step S314 of storing the authenticated signature-bound event log separately from the authentication-failed event logs that have not been successfully authenticated may alternatively be referred to as a "log storage unit".

Figure 6:
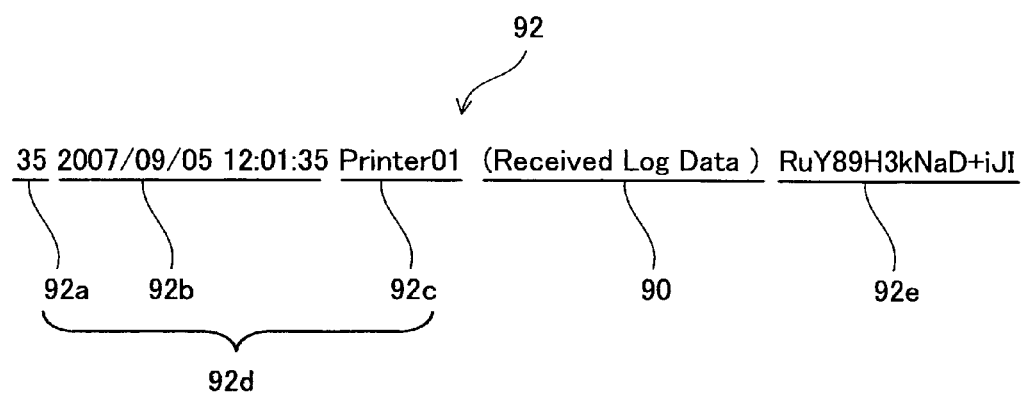
FIG. 6 shows an example of a managing-side signature-bound event log.

FIG. 6 shows an example of a managing-side signature-bound event log. The managing-side signature-bound event log 92 includes a header 92d, signature-bound event log 90, and server-side digital signature 92e. The header 92d includes the number of times of reception 92a, the current time 92b and device name 92c. The character string "Printer01" of the device name 92c in FIG. 6 represents the printer 10 that had sent the signature-bound event log 90. The name of the printer 10 is identified by the device information acquired from the printer 10. The signature-bound event log 90 following the header 92d is identical with the signature-bound event log 90 which has been received from the printer 10. In FIG. 6, the signature-bound event log 90 is depicted as the "(Received Log Data)". This means that the "(Received Log Data)" is identical with the signature-bound event log 90 shown in FIG. 4. The server-side digital signature 92e is created in step S310.

The usage of the header 92d that is appended by the server 50 will now be described. The header 92d contains the number of times of reception 92a. In addition, a log number indicating the number of times of transmission of an event log is appended to the signature-bound event log 90 that is transmitted by the printer 10. If the number of times of reception and the log number are different, this indicates that some event logs have been lost. In other words, loss of event logs can be found by a managing-side signature-bound event log. For example, if an event log has been lost, there will be a gap in the log numbers 90a in the event logs belonging to the same device name 92c. Consequently, loss of an event log can easily be found by comparing the log numbers 90a (the serial number of reception) of the two items of managing-side signature-bound data that have been consecutively received from the same device.

The header 92d includes the current time 92b, which is appended thereto by the server 50. In addition, the signature-bound event log 90 that is transmitted by the printer 10 is stamped with another current time (or lapsed time from startup) conferred by the printer 10. The offset of the time of the clock incorporated in the printer 10 can be identified by comparing the current time 92b conferred by the server 50 and the current time 90b conferred by the printer 10.

The log management system 100 described above has the technical features listed below.

(1) The printer 10 (information processing device) creates a hash value from event log every time an event occurs. The printer 10 creates a hash value from the event log and creates a digital signature by encrypting the hash value using its own private key (device private key 32). The printer 10 transmits to the server 50 the signature-bound event log obtained by binding the digital signature with the event log. Thus, the server 50 is able to manage the event logs merely by the receiving of the signature-bound event logs that are of short data length. Consequently, event log tampering can be detected without requiring a complicated encryption protocol, which endows benefit of not increasing the communication load. Also, since the printer 10 transmits the signature-bound event log every time an event occurs, if even a single signature-bound event log is tampered with (or lost), the damage can be kept minimized.

It may be noted that "an event log to which a digital signature is bound using a private key" may alternatively be expressed as an event log that is encrypted by a private key.

(2) The printer 10 (information processing device) includes in the event log the number of startup times (number of times that the power source of the printer 10 is turned on), the current time, and the transmission order of the event log (number expressing the sequential number of transmission of the event log). The same events may occur in different information processing devices such as printers. By appending information such as the current time with the event log, the event logs of events occurring at different times are forced to have different contents. Consequently, there is no possibility of identical digital signatures being created. It is not necessary that all of these items, namely: the number of startup times, the current time and the sequential number of transmission of the event log should be included in the event log. It suffices if any one of these items of information, but preferably two or more, is included in the event log.

(3) The server 50 verifies the signature-bound event log that is received from the printer 10 by using the public key of the printer 10 (device public key 34), and authenticates the verified signature-bound event log. The server 50 stores signature-bound event logs that have been successfully authenticated separately from signature-bound event logs that have not been successfully authenticated. Consequently, the server 50 can therefore store the correct signature-bound event logs that have been confirmed of not having been the subject of tampering (i.e. signature-bound event logs that have been successfully authenticated). Also, since the server 50 receives a signature-bound event log every time an event occurs, even if only one signature-bound event log is tampered with (or lost), the damage can be kept minimized.

(4) The server 50 appends the current time with the authenticated signature-bound event log. The server 50 then creates a hash value from the signature-bound event log that is stamped with the current time. In addition, the server 50 creates a server-side digital signature (managing-side digital signature) by encrypting the hash value that has been created, using its own private key (server private key 62). The server 50 creates a managing-side signature-bound event log (step S312) by binding the server-side digital signature with the signature-bound event log that has been authenticated. The server 50 stores the managing-side signature-bound event log separately from signature-bound event logs that have not been authenticated. By such processes, the server 50 is able to manage the event logs of the printer 10 under high security.

In the above embodiment, a printer 10 was described that was capable of measuring the current time. However, even in the case of a printer that does not have a clock, it may sometimes be necessary to manage event logs together with the time of occurrence of the event in question. In such cases, if the following characteristic construction is adopted, the log management system can manage the time relationship of a plurality of signature-bound event logs even if the printer or other information processing device does not have a time measurement unit (such as for example a clock).

(5) The printer 10 appends any one of the following items of information, namely: the current time, lapsed time since the printer 10 was started up, and number of times of transmission, with the signature-bound event log. Such items of information are termed "printer-side time information". The printer 10 transmits a signature-bound event log to which the printer side time information has been appended. The server 50 stores this signature-bound event log to which the printer side time information has been appended, after appending thereto the current time or the number of times of reception. The information that is thus appended by the server 50 is termed the "server-side time information". Since this log management system stores event logs stamped with printer side time information and server-side time information, loss of event logs can be found.

The above technical features can be realized by hardware of a printer 10 (information processing device) and server 50 (log management apparatus) according to the present embodiment, or can be realized by software. Some of the technical advantages disclosed in the present specification are obtained by the technical features of the printer 10 alone. Other technical advantages disclosed in the present specification are obtained by technical features of the server 50. Further, the teachings disclosed in the present specification may be embodied in a log management system including one or more information processing device that creates event logs, and a log management apparatus that keeps track of the created event logs. The log management system 100 including a printer 10 and server 50 can realize the technical advantages disclosed in the present specification in an excellent manner. The teachings disclosed in the present specification can be applied to a wide range of devices connected with a network, not merely printers. Also, the processes executed by the various modules of the information processing device(s) and log management apparatus described above may be embodied as a computer program product.

It is also possible for the server 50 to discard signature-bound event logs that have not been successfully authenticated, without storing them in the authentication-failed log folder 68.

Furthermore, in the embodiment above, the server 50 not only receives the signature-bound event log 90 from the printer 10 and authenticates by verifying the match of the hash value derived from the signature-bound event log 90 using the device public key 34 and the hash value created on the server 50 side from the event log 90e, but also utilizes time factors to create a time-stamped signature-bound event log from the received signature-bound event log 90, and the server private key 62 to further create a digital signature on the server 50 side to be bound to the authenticated signature-bound event log 90. However, the former technique and the latter technique may be employed independently to construct a log management server.

While specific embodiments of the present invention have been described in detail above, these are merely given by way of example and are not intended to restrict the scope of the claims. The teachings set out in the claims include various modifications or alterations of the specific examples described above. Also, the technical elements described in the present application or drawings exhibit technical utility alone and in various combinations and are not restricted to the combinations set out in the claims at the time of application. Also, the techniques exemplified in the present application or drawings achieve more than one object simultaneously and have technical utility in themselves by achieving any one of these objects.

What is claimed is:

1. A log management apparatus comprising:
a processing unit;
a storage unit having machine readable instructions stored thereon that when executed by the processing unit cause the apparatus to receive a signature-bound event log created by an information processing device through a network, the signature-bound event log being created by binding an event log of each event that occurred and a digital signature created by encrypting, with a private key of the information processing device, a hash value created from the event log;

decrypt the hash value from the digital signature bound in the received signature-bound event log with a public key of the information processing device;

create a new hash value from the event log in the received signature-bound event log;

verify coincidence between the decrypted hash value and the new hash value; and authenticate the signature-bound event log if the decrypted hash value coincides with the new hash value; and a log storage that stores the signature-bound event log with a managing-side digital signature being bound thereto when the signature-bound event log has been successfully authenticated, and stores the signature-bound event log without binding the managing-side digital signature when the signature-bound event log has not been successfully authenticated.

2. A non-transitory computer readable medium storing a computer program for a computer that manages an event log transmitted from an information processing device through a network, the computer program including instructions for the computer to execute, in a case where the computer receives a signature-bound event log created by the information processing device through the network, the signature-bound event log being created by binding an event log of each event that occurred and a digital signature created by encrypting, with a private key of the information processing device, a hash value created from the event log, wherein the instructions when executed cause the computer to perform:

decrypting of the hash value from the digital signature bound in the received signature-bound event log with a public key of the information processing device;

creating of a new hash value from the event log in the received signature-bound event log;

verifying of coincidence between the decrypted hash value and the new hash value to authenticate the signature-bound event log with which coincidence is verified; and storing of the received signature-bound event log with a managing-side digital signature being bound thereto when the signature-bound event log has been successfully authenticated, and storing of the received signature-bound event log without binding the managing-side digital signature when the signature-bound event log has not been successfully authenticated.

\* \* \* \* \*